W. A. TURBAYNE.
SYSTEM OF ELECTRICAL REGULATION.
APPLICATION FILED DEC. 11, 1915. RENEWED OCT. 9, 1919.

1,325,598.  Patented Dec. 23, 1919.

Witnesses

Inventor
William A. Turbayne
By Raymond H. Van Nest
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL REGULATION.

1,325,598.  Specification of Letters Patent.  Patented Dec. 23, 1919.

Application filed December 11, 1915, Serial No. 66,276. Renewed October 9, 1919. Serial No. 329,644.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Regulation, of which the following is a specification.

This invention relates to systems of electrical regulation.

This system is, in some of its aspects, similar to that disclosed in United States application, Serial No. 847,941, filed June 29, 1914, by the same applicant, and is to be considered as correlative with the system disclosed in that case. There are at present known to those skilled in the electrical arts, systems of regulation involving regulators for variable speed shunt wound generators such as are used in car-lighting systems, in which a fixed resistance is arranged to be connected in the generator field circuit, the effective value of said resistance being varied by means of a vibrating relay. In such known systems, the relay has been provided with a series coil and with a shunt coil connected across the generator terminals. The generator is normally regulated for constant current by the series coil, but when the voltage across the system has risen to a predetermined point, the shunt coil is rendered effective to regulate for substantially constant voltage.

An object of the present invention is to provide a regulator of the vibrating relay type which may be more accurately adjusted to maintain predetermined current and voltage regulation, than previous regulators of this type.

Another object is to provide a system of this type in which the voltage regulator will remain inactive until a predetermined condition of the system is reached and which will thereafter regulate to maintain a constant voltage on the system.

Another object is to provide a system of the type above referred to which will be sensitive to small changes of current or voltage.

Another object is to provide a system in which the character of regulation is changed in correct response to the condition of the storage battery to be charged.

Other objects will appear as the description proceeds.

Referring to the accompanying drawings:—

Figure 1:
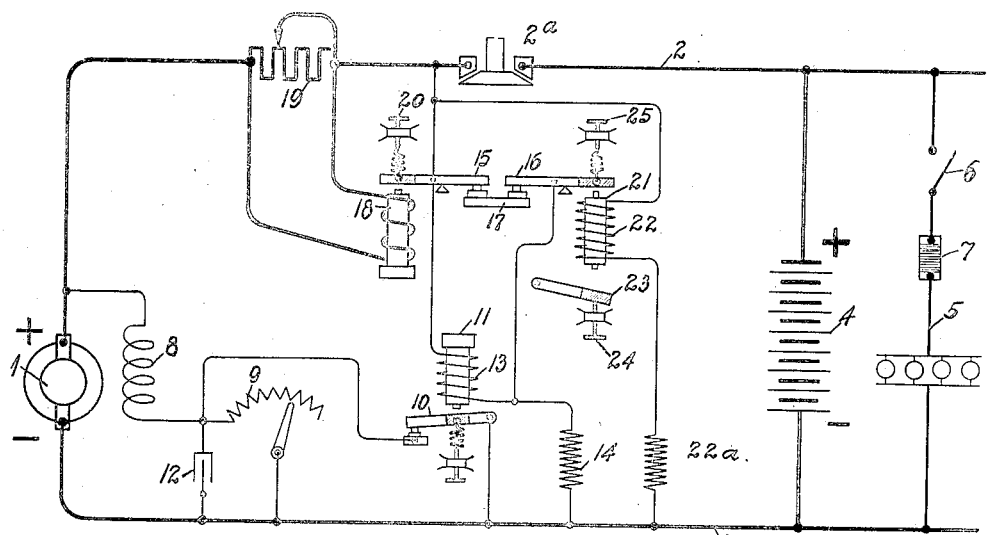
Figure 1 represents diagrammatically one embodiment of the invention.

Referring to Fig. 1, a variable speed generator is indicated as a whole by the numeral 1. The generator is connected to supply the mains 2 and 3 across which in parallel branches are connected the battery 4 and the translation circuit 5. An automatic switch $2^a$, of any preferred construction, is inserted in the main circuit to close circuit when the generator is operative to charge the storage battery or supply the translation circuit. The translation circuit is provided with a switch 6 and a regulator of any desired type, indicated diagrammatically at 7. The generator is provided with a shunt field coil 8, connected through the variable resistance 9 across the generator terminals. The resistance 9 is adapted to be short circuited by the armature 10 of the main regulator 11. A condenser 12 may be connected across the regulator contacts to suppress sparking. The main regulator 11 is provided with a coil 13, connected across the main circuit. A resistance 14 of zero temperature coefficient may be connected in series with the coil 13 to minimize the effects of changes of temperature, and also to hold the current through coil 13 within a desirable limit. The coil 13 is normally inert, being short-circuited by the armatures 15 and 16, which co-act with the fixed contact piece 17. The armature 15 is controlled by a relay 18, the coil of which is shown as connected in the main generator circuit around an adjustable shunt 19. The armature 15 is held in contact closing position by a spring, adjustable by means of the thumb screw 20. The relay 18 is therefore responsive to total generator current output. In a system involving regulators of the vibrating type, which are totally inoperative until a certain predetermined energization is reached, the coil 18 may be placed in the battery circuit, if desired, without introducing any changes in the remainder of the system, thus being responsive to battery current. The armature 16 is controlled by a relay 21 provided with a coil 22 connected across the main circuit. A resistance $22^a$ of zero temperature coefficient may be inserted in series with the coil 22, to minimize the effect of temperature changes. It will be apparent that the armatures 10, 15 and 16, when operative, will have a vibratory action in a manner well understood.

Figure 3:
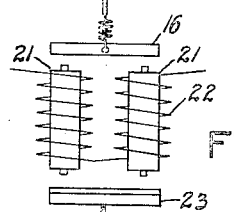
Fig. 3 represents a detail.

For an understanding of the relay 21, reference is had to Fig. 3. The relay 21 consists of two cores placed in parallel positions. These cores are bridged at one end by the armature 16 and at the other end by an armature 23. The position of the armature 23, relative to the relay 21, is adjustable by means of the thumb screw 24, while the tension with which the armature 16 is held in contact-closing position is adjustable by means of the thumb screw 25. It will be apparent that, with the armatures 16 and 23 at maximum distances from the relay 21, as shown in Fig. 3, the magnetic reluctance of the relay will be a maximum. The parts may be adjusted so that when a predetermined voltage has been attained across the main circuit, the coil 22 will be sufficiently energized to draw up the armature 23, thus materially reducing the magnetic reluctance of the relay 21. Due to this decrease in magnetic reluctance, a much lower voltage will be required to attract the armature 16. It will be understood, of course, that the various parts referred to in this description as making and breaking electrical contact, will be provided with suitable contact points, and also that the pivoted conducting members 10, 15 and 16 which are described as armatures, may be strips of non-magnetic material, carrying a piece of magnetic material.

One mode of operation of the system illustrated in Fig. 1, is as follows:—Under conditions of rest the various parts will be positioned as indicated on the drawing. The armatures 15 and 16 will be held in firm engagement with the contact member 17 and the armature 10 will be held downward, effectively short-circuiting the resistance 9. Upon rotation of the generator 1, the same will rapidly build up in voltage, and when the voltage is sufficiently high, the automatic switch 2ª will close. When the current through the winding of the series relay 18 is sufficient to overcome the pull of the spring, armature 15 will be attracted and separated from contact piece 17, thereby admitting into circuit the winding 13 of the main regulator 11, which immediately responds to insert the resistance 9 into the field circuit. The insertion of the resistance 9 immediately brings about a reduction in voltage and consequent reduction in current. This action will be repeated and the device will rapidly vibrate. The predetermined normal current will be maintained through the winding of relay 18, regardless of voltage conditions existing across the mains 2, 3. When a predetermined voltage condition is attained, the armature 23 will be attracted. As explained above in connection with Fig. 3, the approach of the armature 23 to the relay 21 will cause the magnetic reluctance of said relay to be materially reduced and the armature 16 will respond to a much lower voltage than that required to operate armature 23, the value of such lower voltage being determined by the spring adjustments. In car-lighting service, this might be that voltage for instance, required to just float the battery across the line. After the relay 21 has acted to maintain this low floating voltage upon the generator, the current will be so reduced that the relay 18 will become ineffective and armature 15 will remain in contact with the contact piece 17. Regulation thereafter will be wholly by action of the voltage device. As the armatures 15 and 16 are in series relation, said armatures are equally effective, each acting in response to its corresponding magnet, in controlling admission of current to the winding 13 of the main regulator 11.

The armatures 10, 15 and 16 are undamped and, being made light, will have little inertia. They will therefore be sensitive to small changes of current or voltage. As the current through coil 13 of regulator 11 will ordinarily be of very low value, it will be unnecessary to connect a condenser across this winding, but as the current broken by the contacts of said regulator 11 may, in certain cases, be of considerable magnitude, it will be desirable to provide the condenser 12 across these contacts to prevent sparking.

Figure 2:
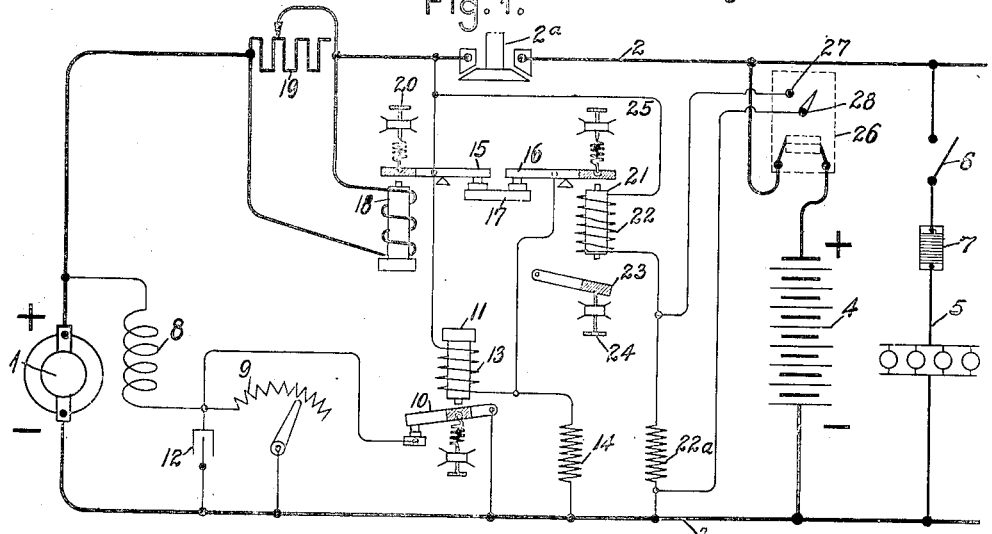
Fig. 2 represents diagrammatically another embodiment of the invention.

Referring now to Fig. 2, it will be noted that the system shown therein is, in many of its details, identical with the system shown in Fig. 1. Fig. 2 discloses an improvement over Fig. 1, however, in that the voltage regulation is thrown in in response to the state of charge of the battery. In Fig. 2, an ampere hour meter 26 is placed in the battery circuit to measure battery input and output. The ampere hour meter may be of any preferred type, but should be of the type which automatically changes its rate of registration upon reversal of current flow therethrough. Such a meter may be calibrated to compensate for battery losses, so that it will at all times indicate the available charge in the battery. The meter 26 is provided with contacts 27 and 28, adapted to close a short-circuit around the resistance 22ª.

A mode of operation of the system disclosed in Fig. 2 is substantially as follows: The generator will be regulated to produce a constant current through the agency of the relay 18 and the main regulator 13, as described in connection with Fig. 1. When a predetermined number of ampere hours, indicating full charge, have been delivered to the battery, the contacts 27, 28 will be closed, short-circuiting the resistance 22ª. The voltage relay 21 will immediately respond, reducing the generator voltage to the floating voltage of the battery.

The adjustments of the voltage regulating device will be such that it will not, of itself, respond directly to voltage conditions across the line so long as the battery circuit is intact, but it will only do so under control of the ampere hour meter, after a certain number of ampere hours have entered the battery. In the event of an unusual voltage rise, however, such as might follow the accidental opening of the battery circuit, the voltage device will respond to a voltage slightly higher than the maximum voltage which would exist were the battery circuit intact, and will act to maintain a safe low voltage upon the generator despite the open circuit on the battery.

Two embodiments of the present invention have been illustrated and described. Many modifications will occur to those skilled in the art. It is intended that this patent shall include all such modifications that fall within the scope of the invention as defined by the appended claims.

Having described the invention, what I claim as new and desire to secure by Letters Patent of the United States is:—

1. Means for regulating a generator comprising a resistance element arranged in series with a generator field winding, a vibrating regulator to control a short circuit around said resistance, and a plurality of relays each having a vibratory armature controlling a short circuit around said regulator, one of said relays having a second armature normally maintaining an air-gap sufficient to render the other armature thereof inoperative.

2. Means for regulating a generator comprising a resistance element arranged in series with a generator field winding, a vibrating regulator for controlling the effective inclusion of said resistance in the field circuit, and a plurality of relays each having a vibrating armature to control a short circuit around said regulator, one of said relays having a second armature normally maintaining an air-gap sufficient to render the other armature thereof inoperative, said latter relay being connected across the generator terminals and the other relay being connected in series with the armature thereof.

3. In a regulating system, a variable speed generator, a storage battery supplied thereby, a resistance element in series with the generator field, a vibrating regulator for controlling the effect of said resistance, a current relay, a voltage relay connected across the generator circuit, each of said relays having an armature to vibrate freely, each of said armatures controlling a short circuit around said regulator, said voltage relay having a yoke which normally maintains a sufficient air-gap to render its corresponding armature inoperative whereby the latter becomes operative only upon predetermined voltage increase of the generator sufficient to cause the attraction of said yoke.

4. A regulator comprising a resistance element, a series relay, a shunt relay and a master relay, said master relay being controlled by said series and shunt relays, said shunt relay being provided with means to permit same to operate at a lower voltage than that at which it responds initially.

5. In a system of electrical distribution, a variable speed generator, means for regulating said generator comprising a resistance element arranged in series with the generator field winding, a vibrating regulator to control a short circuit around said resistance, a plurality of relays each having a vibrating armature controlling a short circuit around said regulator, one of said relays having a second armature normally maintaining an air-gap sufficient to render the other armature thereof inoperative, a storage battery to be charged by said generator, and means responsive to the state of battery charge for controlling one of said relays.

6. In a system of electrical distribution, a variable speed generator, regulating means therefor comprising a resistance element adapted to be thrown in and out of effective series relation with the generator field winding, a regulator for controlling said resistance, a current responsive relay for controlling a short circuit around said regulator, a voltage responsive relay for controlling a short circuit around said regulator, a storage battery to be charged, and means in series with said battery responsive to the state of battery charge for controlling said voltage responsive relay.

7. A system comprising a variable speed generator, a regulator therefor comprising a resistance element, a series relay, a shunt relay and a master relay, said master relay being controlled by said series and shunt relays, said shunt relay being provided with means to permit same to operate at a lower voltage than that at which it responds initially, a storage battery to be charged, and means responsive to the state of battery charge for controlling said shunt relay.

8. In a system, a variable speed generator, a vibrating regulator therefor adapted to control a resistance in the field circuit of the generator, a short circuit around said regulator, a vibrating current relay for controlling said short circuit, a vibrating voltage relay for controlling said short circuit, said current relay being inoperative when said voltage relay is operative, and vice versa, a storage battery to be charged, and means responsive to the state of battery charge for controlling said voltage relay.

9. In a system, in combination, a variable speed generator, a vibratory regulator therefor adapted to control a resistance in the field circuit of a generator, a short circuit around said regulator, a vibratory current relay for controlling said short circuit, a vibratory voltage relay for controlling said short circuit, said voltage relay being provided with means to permit same to operate at a lower voltage than that at which it responds initially, a storage battery to be charged, and means responsive to the state of battery charge for controlling said voltage relay.

In witness whereof, I have hereunto subscribed my name.

WILLIAM A. TURBAYNE.